Sept. 16, 1969     I. L. RAMBERG     3,466,949
MACHINE TOOL INDEXING ASSEMBLY
Filed Dec. 26, 1967     2 Sheets-Sheet 1
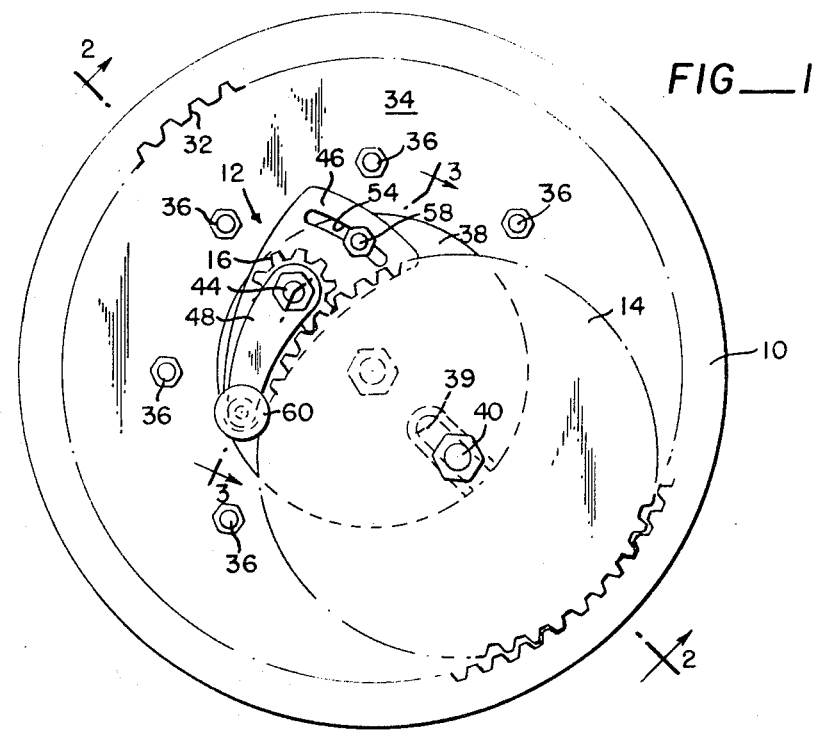
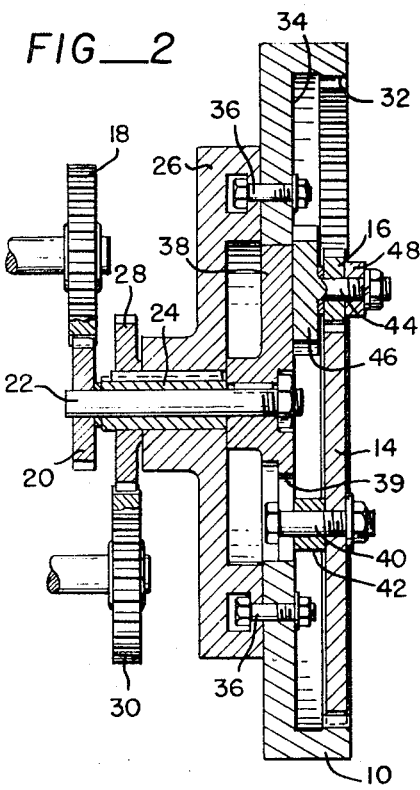
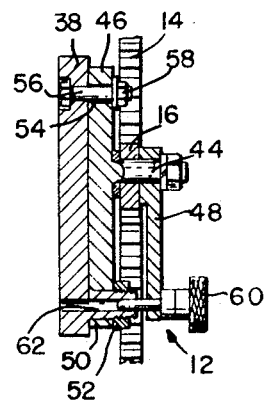
INVENTOR.
INGWALD L. RAMBERG
BY
ATTORNEYS Sept. 16, 1969  I. L. RAMBERG  3,466,949
MACHINE TOOL INDEXING ASSEMBLY
Filed Dec. 26, 1967  2 Sheets-Sheet 2
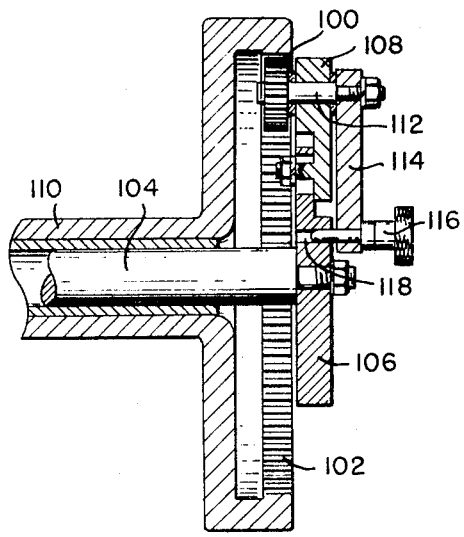
FIG__4
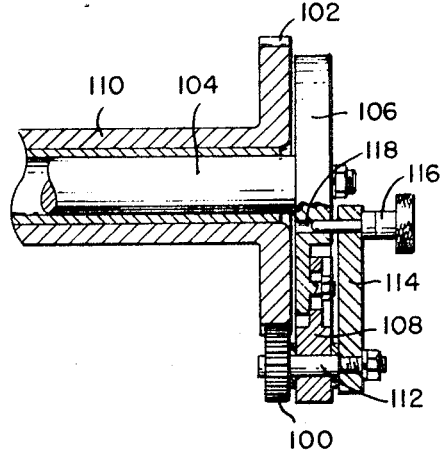
FIG__5
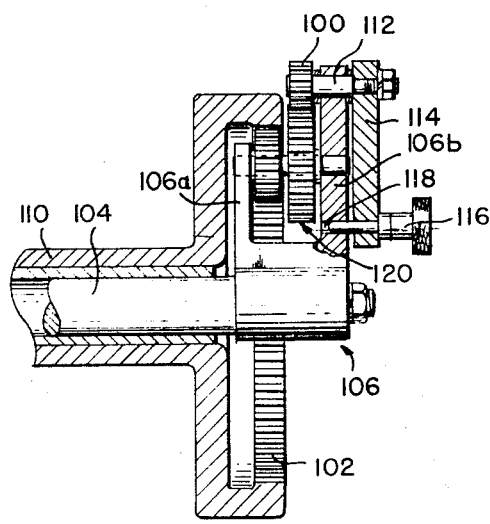
FIG__6
INVENTOR.
INGWALD L. RAMBERG
BY
ATTORNEYS

United States Patent Office

3,466,949
Patented Sept. 16, 1969

3,466,949
MACHINE TOOL INDEXING ASSEMBLY
Ingwald L. Ramberg, 500 S. Portland,
Seattle, Wash. 98108
Filed Dec. 26, 1967, Ser. No. 693,324
Int. Cl. B23b *29/24;* B23a *17/00*
U.S. Cl. 74—813                                   8 Claims

ABSTRACT OF THE DISCLOSURE

Milling machines, thread mills, and like machine tools are provided with an indexing assembly interlocked into the transfer drive gear train to effect indexing adjustment, for example of a workpiece spindle relative to a tool-mounting lead screw. The indexing assembly provides a rotatable indexing gear mounted to effect adjustment of the work spindle and an actuating pinion and idler gear mechanism mounted to rotate the indexing gear.

---

Machine tools such as milling machines, thread mills and the like are designed to transfer relative motion between operating elements of the machines. In a milling machine for example, a transfer drive train is linked between the workpiece spindle and the milling tool-mounting lead screw such that relative motion is transferred from the workpiece spindle to the lead screw to drive the latter. For certain operations performed by such machines, one operating element must be indexed relative to the other without affecting the position of the other. On a milling machine for example, a cylindrical workpiece being milled to provide a multiplicity of helices along the surface thereof will require that the workpiece spindle be rotatably indexed a predetermined degree relative to the lead screw for each helix milled into the surface; i.e., the initial position of the workpiece mounted by the workpiece spindle must be varied relative to the milling tool mounted by the lead screw before the milling tool can cut a new helix.

Indexing mechanisms have been incorporated into the transfer drive train to effect such relative indexing between the machine tool operating elements interconnected by the transfer drive train. Such indexing mechanisms have been difficult to operate because of the calculations required to determine the proper relative movement within the indexing mechanism itself to effect a desired indexing adjustment. Such indexing mechanisms also have not permitted as fine a degree of indexing adjustment as is often required.

Typical of such indexing mechanisms is a device comprising two concentric shafts, one interconnected into one section of the machine tool transfer drive train and the other interconected into another section of the transfer drive train, a flange plate mounted to the outer concentric shaft and a crank arm mounted to the inner concentric shaft and overlaying the flange plate. The flange plate is provided with several concentric rows of holes, each row having a different number of equally spaced holes. The outer end of the crank arm is provided with an index pin adapted to be inserted into any one of the holes in the flange plate. When the index pin is inserted into a hole in the flange plate, the relative angular positions of the crank arm and the flange plate, and concomitantly their respective concentric shafts, are fixed. Thus, operation of one operating element of the machine tool will transfer rotational motion into one section of the transfer drive train and through the indexing mechanism concentric shafts, by reason of the two concentric shafts being rotatively fixed to one another as described above, to the other section of the transfer drive train to drive the other operating element.

The operating elements of the machine tool are indexed relative to one another in such an indexing device by pulling the index pin free from the flange plate and revolving the crank arm to rotate the inner concentric shaft connected thereto relative to the outer concentric shaft. Thus, the section of the drive train connected to the inner concentric shaft will be actuated to effect motion in the operating element connected to that section of the drive train relative to the other operating element. In the usual case, the required indexing necessitates revolving the crank arm a calculated number of full revolutions plus so many holes. It is not difficult to miscount the holes or turns and spoil the workpiece. Furthermore, the diameter of the flange plate and the size of the index pin place a limit on the number of holes that can be placed in the flange plate and therefore limit the magnitude of the highest prime number attainable in the index. The index pin diameter must, of course, be large enough to withstand the forces tending to rotate the flange plate relative to the crank arm when the indexing device functions as a passive interlock between the two sections of the transfer drive train.

By the present invention, an indexing assembly for milling machines, thread mills and the like is provided wherein a choice of a greater range of index ratios and a higher prime number is available over known index assemblies. The present invention also is operable in a manner that is less susceptible to misuse by miscalculation than known index assemblies. More particularly, the present invention permits selection of the prime number required to produce the exact index ratio required by one or multiple full revolutions of an actuating pinion subassembly.

These and other objects and advantages of the present invention will become apparent from the following description considered in conjunction with the accompanying drawings, of which:

FIG. 1 is a front elevation view of a preferred embodiment of this invention employing an internal indexing ring gear, an indexing pinion and an idler gear;

FIG. 2 is a cross section taken along the line 2—2 of FIG. 1;

FIG. 3 is another cross section taken along the line 3—3 of FIG. 1;

FIG. 4 is a cross section of another embodiment of this invention employing an internal indexing ring gear and an indexing pinion without an idler gear;

FIG. 5 is a cross section of still another embodiment of this invention similar to the FIG. 4 embodiment except that the indexing gear is externally toothed; and FIG. 6 is a cross-section of still another embodiment of this invention similar to the FIG. 4 embodiment except that a compound idler gear is employed.

In brief the indexing assembly of this invention comprises two concentric shafts, an indexing gear mounted axially to the outer concentric shaft, an actuating pinion adapted to be drivingly engaged with the indexing gear, either directly or through idler gearing, mounting means mounted axially to the inner concentric shaft and mounting the actuating pinion eccentrically to the axis of the inner concentric shaft, and an actuating arm connected to the actuating pinion for rotating the actuating pinion and adapted to be restrained relative to the mounting means when not being revolved to rotate the actuating pinion. The concentric shafts are adapted to be interconnected into different sections of a transfer drive train such that rotation of the indexing gear, effected by rotating the actuating pinion, will operate one section of the transfer drive train relative to the other section, and such that the concentric shafts will rotate as a unit when the indexing assembly is not being employed to index the machine tool of which it is a part.

Referring to the figures, the preferred embodiment of the indexing assembly, as applied to a milling machine transfer drive gear train by way of example, comprises an indexing gear 10 mounted for incremental rotative adjustment of the milling machine work spindle, an adjustably mounted actuating pinion subassembly 12, and an adjustably mounted idler gear 14 positioned in mesh with the indexing gear 10 and the actuating pinion 16 of subassembly 12. The milling machine lead screw mounts a gear 18 in driving mesh with the indexing assembly of this invention through hub gear 20 mounted by hub 22, the usual change gear arrangement between the indexing assembly and the lead screw being thus depicted in simplified form. The hub 22 is rotatably mounted by a bushing 24 which in turn rotatably mounts an indexing gear carrier 26 and a gear 28 keyed for rotation with carrier 26. Gear 28 is meshed with a gear 30 mounted by the milling machine lead screw.

The indexing gear 10 is provided with an internal ring of teeth 32 and with an annular mounting flange 34 adapted to be detachably bolted to a peripheral flange of the carrier 26 by a plurality of bolts 36. A circular hub flange 38 is keyed and bolted to the hub 22 for rotation therewith and is of a diameter adapted to closely fit within the circular cutout of the annular mounting flange 34, thus to facilitate proper mounting of the indexing gear 10 for attachment of the carrier 26.

The hub flange 38 is provided with a radial slot 39 for for receiving a bolt 40 to which the idler gear 14 can be journal mounted in mesh with the ring of gear teeth on indexing gear 10. A bushing 42 may be provided between the outer face of the hub flange 38 and the inner face of the idler gear 14 to align the teeth of the idler gear with the teeth of the indexing gear.

The actuating pinion assembly 12 comprises actuating pinion 16 journal mounted to a stub shaft 44 extending from the outer face of a pivotable plate 46, and an actuating lever arm 48 journal mounted on the stub shaft 44 and keyed to the pinion 16. The plate 46 is journal mounted at one end to a stub shaft 50 extending from the outer face of the hub flange 38 at a point eccentric to the centerpoint thereof, and is retained on the stub shaft 50 by a nut 52 threaded onto the end thereof. The plate 46 is provided with an arcuate slot 54 at the other end adapted to receive a bolt 56 extending therethrough from the hub flange 38 so that the plate 46 can be locked into a desired position by tightening a nut 58, threaded onto the end of bolt 56, down onto the plate 46. The end of the lever arm 48 is provided with a knurl-headed index pin 60 removably inserted into an axial bore 62 within the stub shaft 50.

It will be noted that the ring gear teeth on the indexing gear 10 are located sufficiently outward from the outer face of the mounting flange 34 such that the pinion 16 and idler gear 14 can mesh and such that idler gear 14 can mesh with the gear teeth of indexing gear 10 with adequate width being provided between the outer face of the mounting flange 34 and the pinion 16 to accommodate plate 46.

With the indexing assembly in the position shown in the figures, its operation to index the milling machine work spindle relative to the milling machine lead screw would be as follows: The shank of pin 60 is pulled from confinement in the bore 62 so as to free the lever arm 48 for rotation. Arm 48 is then rotated, however many complete revolutions are required and then centered over bore 62 and pin 60 is returned to a locking position with its shank confined by bore 62. As the arm 48 is revolved, pinion 16 also revolves thereby rotating idler gear 14 and indexing gear 10. Each revolution of pinion 16 effects a rotation of indexing gear 10 equal to the direct ratio of the number of teeth on pinion 16 to the number of teeth on indexing gear 10. The idler gear 14 has no function in the index ratio but does permit positioning the pinion near the center of the index assembly for convenience in mounting the hub. Inasmuch as the gears can have a fine pitch, the indexing assembly can provide a very high prime number.

The index ratio can be varied by changing the pinion, the indexing gear, or both. In the usual case, the pinion would not be changed, rather a particular indexing gear would be selected from a set of indexing gears having different pitch diameters. To change the indexing gear, the nut 58 on bolt 56 is loosened and the plate 46 is pivoted to move the pinion out of engagement with the idler gear 14, the nut is removed from bolt 40 and the idler gear is shifted out of engagement with the teeth of the indexing gear and then removed, and then the nuts on bolts 36 are removed and the indexing gear removed outwardly from the carrier 26. The selected indexing gear is then bolted to the carrier 26 with bolts 36. A suitable idler gear 14, having sufficient diameter to span the distance between the ring on indexing gear 10 and the position of the pinion as determined by the arcuate slot 54 in plate 46, is bolted to the hub flange 38 in mesh with the indexing gear. The plate 46 is then pivoted to engage the pinion with the idler gear and the nut 58 tightened down onto plate 46.

It will be noted that the meshed gear teeth serve to fix the relative angular position of hub 22 and the carriage 26 when the pin 60 is confined in the bore 62, and thus the indexing assembly will rotate as a unit during normal operation of the machine to which it is attached.

It is seen that the effect of rotating the pinion 16 is to angularly index the shaft of carrier 26 and its gear 28 relative to the hub 22 and its gear 20. Thus, the angular position of the transfer drive chain section represented by gear 30 is changed or indexed relative to the angular position of the transfer drive chain section represented by gear 18. In a manner of speaking, the transfer drive sections, interconnected by and through the indexing assembly are timed relative to one another.

FIGURE 4 depicts a structure similar to that of FIGS. 1–3, except that the idler gear is eliminated such that the actuating pinion 100 directly meshes with teeth of the internal index ring gear 102. In this embodiment, the inner concentric shaft, or hub 104, axially mounts flange 106, a section 108 of which is adjustable radially as depicted. The outer concentric shaft 110 axially mounts the ring gear. A stub shaft 112 is journal mounted in the section 108 and has the pinion mounted internally on one end and the actuating lever arm 114 mounted externally on the opposite end. The outer free end of the actuating arm is provided with the index pin 116, the shank of which is adapted to be removably inserted into the bore 118 in the flange. The index gear 102, of course, may be detachably mounted as the index gear 10 of the FIGS. 1–3 embodiment. Thus, the radial adjustability of section 108 permits accommodating various index gear diameters.

The FIG. 5 embodiment is depicted identical to the FIG. 4 embodiment except that the index gear 102 is a gear wheel and not an internal ring gear.

The FIG. 6 embodiment depicts the application of a compound idler 120 to the invention. The flange 106 is provided with an internal section 106a to which one end of the compound idler shaft is journal mounted, and with an external section 106b to which the other end of the compound idler is journal mounted and to which the pinion 100 and its actuating arm 114 is journal mounted eccentric to the axis of the hub 104.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows.

I claim:

1. An indexing assembly adapted to be incorporated into a transfer drive train which comprises inner and outer independently rotatable concentric shafts; an indexing gear axially mounted to said outer shaft for rotation with said outer shaft; mounting means mounted to said inner shaft for rotation with said inner shaft; an actuating pinion assembly mounted to said mounting means eccentric to the axis of said inner shaft for operation independently of the rotation of said mounting means and inner shaft and adapted to drivingly engage said indexing gear such that operation of said actuating pinion assembly will effect rotation of said indexing gear; and an activating arm connected to operate said pinion assembly and adapted to be restrained relative to said mounting means to prevent operation of said pinion assembly and thereby to prevent rotation of said outer shaft relative to said inner shaft.

2. The assembly of claim 1 wherein said indexing gear comprises an internal ring gear with a mounting flange and including a carrier axially connected to said outer shaft to which the mounting flange can be detachably mounted.

3. The assembly of claim 1 including an idler detachably journalled to said mounting means and adapted to engage said pinion and said indexing gear; and including a mounting plate pivotally connected to said mounting means with said pinion being journalled to said mounting plate.

4. The assembly of claim 1 wherein said pinion assembly is directly meshed with said indexing gear.

5. The assembly of claim 1 including a compound idler meshed with said pinion and with said indexing gear.

6. The assembly of claim 1 wherein said indexing gear is detachably mounted to said outer shaft and wherein said pinion is adjustably mounted to said mounting means to be engageable with indexing gears of different diameters.

7. An indexing assembly which comprises an internal ring gear with a mounting flange; a rotatable carrier member to which said mounting flange is detachably connected; a hub flange rotatably positioned coaxially with said ring gear; a mounting member pivotally journalled to said hub flange eccentric to the axis of said hub flange; a pinion rotatably journalled to said mounting member; an actuating arm attached to said pinion for revolving said pinion; an actuating pin extending through the free end of said actuating arm against revolution relative to said hub flange; and an idler gear meshed with said ring gear and removably journalled to said hub flange eccentric to the axis of said hub flange, said mounting member being adapted to pivot said pinion into mesh with said idler gear.

8. The assembly of claim 7 including a first gear means mounted for rotation with said hub flange and rotatably interlocking said hub with a machine tool lead screw; and including a second gear means mounted for rotation with said carrier member and rotatably interlocking said carrier member with a machine tool workpiece spindle.

References Cited

UNITED STATES PATENTS

| | | | |
|---|---|---|---|
| 1,024,254 | 4/1912 | Garrett. | |
| 1,865,552 | 7/1932 | Beulwitz | 74—813 |
| 2,186,823 | 1/1940 | De Tar | 74—626 XR |
| 2,357,329 | 9/1944 | Hansen | 74—815 |
| 3,266,270 | 8/1966 | Yutkowitz. | |
| 3,359,828 | 12/1967 | Waite. | |
| 3,363,480 | 1/1968 | Murphy | 74—626 |

FRED C. MATTERN, JR., Primary Examiner

F. D. SHOEMAKER, Assistant Examiner

U.S. Cl. X.R.

74—626, 827